(12) United States Patent
Lin et al.

(10) Patent No.: US 8,528,831 B2
(45) Date of Patent: Sep. 10, 2013

(54) THERMOSTAT WITH EFFICIENCY DISPLAY

(75) Inventors: Andy Lin, Collierville, TN (US); Erich Schroeder, Memphis, TN (US); Nicole Moody, Memphis, TN (US); Robert Schultz, Memphis, TN (US); Kendra Shimmell, Columbus, OH (US); Lauren Serota, Columbus, OH (US)

(73) Assignee: Hunter Fan Company, Memphis, TN (US)

( * ) Notice: Subject to any disclaimer, the term of this patent is extended or adjusted under 35 U.S.C. 154(b) by 889 days.

(21) Appl. No.: 12/631,896

(22) Filed: Dec. 7, 2009

(65) Prior Publication Data

US 2011/0132990 A1 Jun. 9, 2011

(51) Int. Cl.
*G05D 23/19* (2006.01)

(52) U.S. Cl.
USPC ......... 236/94; 236/46 R; 236/91 R; 236/94 D

(58) Field of Classification Search
USPC ............................... 236/46 R, 94, 91 R, 91 D
See application file for complete search history.

(56) References Cited

U.S. PATENT DOCUMENTS

| | | | |
|---|---|---|---|
| 4,293,028 A | 10/1981 | Knoll | |
| 4,751,961 A | 6/1988 | Levine et al. | |
| 4,771,392 A | 9/1988 | Hall | |
| 4,997,029 A | 3/1991 | Otsuka et al. | |
| 5,012,973 A | 5/1991 | Dick et al. | |
| 5,038,851 A | 8/1991 | Mehta | |
| 5,329,991 A | 7/1994 | Mehta et al. | |
| 5,415,346 A | 5/1995 | Bishop | |
| 5,547,017 A | 8/1996 | Rudd | |
| 5,782,296 A | 7/1998 | Mehta | |
| 5,937,942 A | 8/1999 | Bias et al. | |
| 5,957,374 A | 9/1999 | Bias et al. | |
| 6,478,233 B1 * | 11/2002 | Shah | 236/46 R |
| 6,595,430 B1 | 7/2003 | Shah | |
| 6,988,671 B2 | 1/2006 | DeLuca | |
| 7,114,554 B2 | 10/2006 | Bergman et al. | |
| 7,156,317 B1 | 1/2007 | Moore | |
| 7,306,165 B2 | 12/2007 | Shah | |
| 7,360,717 B2 | 4/2008 | Shah | |
| 7,575,179 B2 * | 8/2009 | Morrow et al. | 236/91 D |
| 7,636,604 B2 | 12/2009 | Bergman et al. | |
| 7,693,582 B2 | 4/2010 | Bergman et al. | |
| 7,706,923 B2 | 4/2010 | Amundson et al. | |
| 2006/0017581 A1 | 1/2006 | Schwendinger et al. | |
| 2008/0256475 A1 | 10/2008 | Amundson et al. | |

* cited by examiner

*Primary Examiner* — Marc Norman
*Assistant Examiner* — Jonathan Bradford
(74) *Attorney, Agent, or Firm* — Baker Donelson; Dorian B. Kennedy

(57) ABSTRACT

A thermostat (10) includes a housing (11) having a control panel (13) with a plurality of manually selectable input elements or input keys (15) and a display panel (17) for displaying various functions of the programmable thermostat. The programmable thermostat also includes a temperature sensor (18), a microprocessor (19) having memory for storing a default program set of default temperature and time values and a desired program set of desired temperature and time values. The microprocessor may compare the desired program set to the default program set in order to calculate the efficiency of a HVAC system. The calculated efficiency is then displayed graphically on the display panel.

8 Claims, 2 Drawing Sheets

THERMOSTAT WITH EFFICIENCY DISPLAY

TECHNICAL FIELD

This invention relates to thermostats, and specifically to visual display type thermostats.

BACKGROUND OF THE INVENTION

Thermostats have existed for many years. Recently, programmable thermostats have been designed to include programmable capabilities so that a user may select programs to operate on different days, different times, and different temperatures during each different time. The thermostat then controls a heating and/or cooling system (HVAC system) according to the programmed times and temperatures for each day. The use of these select program time intervals decreases the energy expenses associated with the running of the HVAC system by running the system at different temperatures when the homeowner is "away" from the home, i.e., the thermostat operates the heating system at a cooler temperature setting and operates the cooling system at a higher temperature setting when the owner is suppose to be "away" according to the day and time programmed in the thermostat. However, an owner may not realize the extent of the cost savings associated with the selected time interval and temperature.

Accordingly, it is seen that a need remains for a thermostat that is capable to evaluating and relaying the energy savings associated with the programming of a thermostat. It is to the provision of such therefore that the present invention is primarily directed.

DETAILED DESCRIPTION

Figure 1:
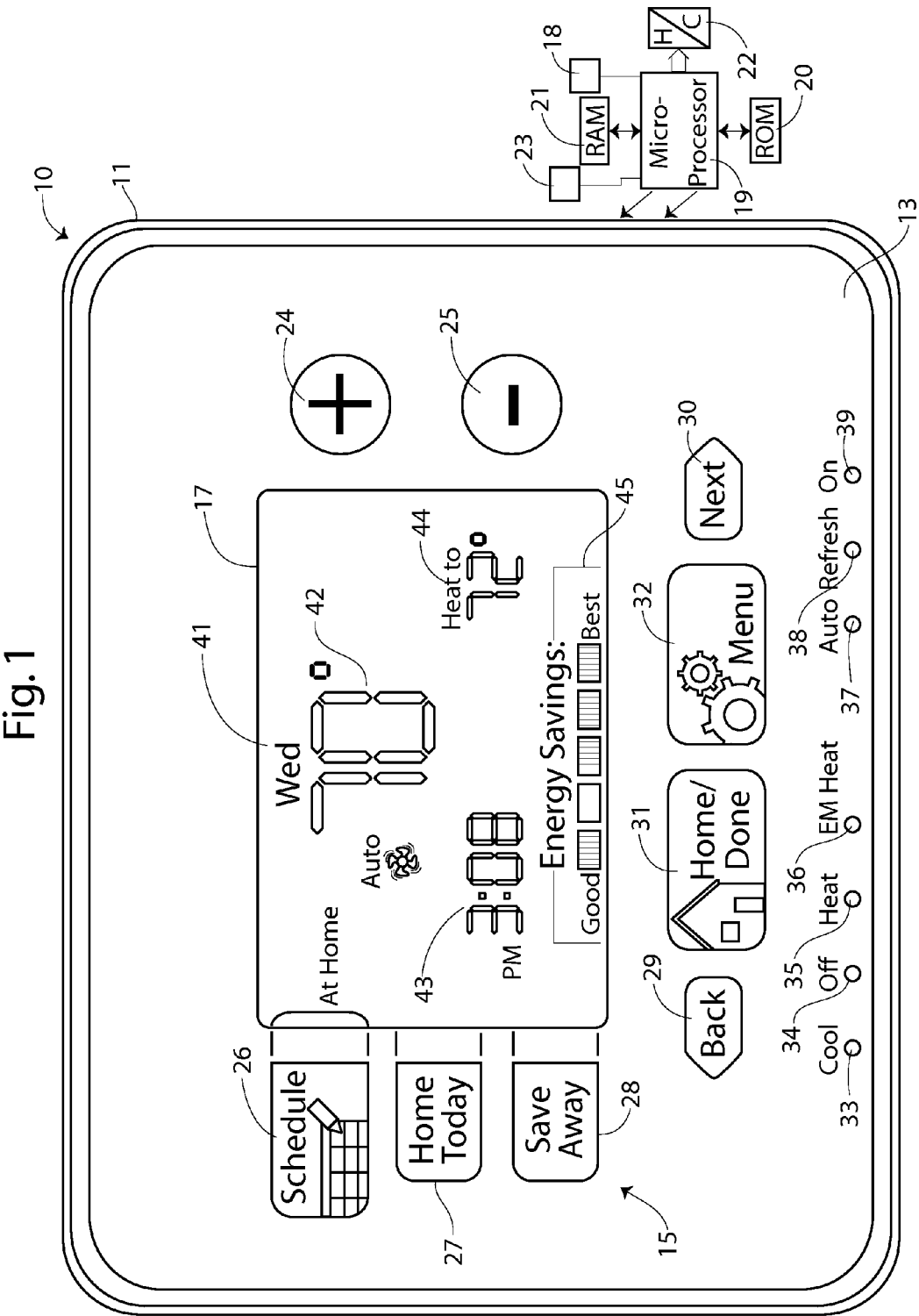
FIG. 1 is a schematic view of a thermostat embodying principles of the invention in a preferred form.

With reference next to the drawings, there is shown a thermostat 10 embodying principles of the invention in a preferred form. The thermostat 10 includes a housing 11 having a control panel 13 with a plurality of manually selectable input elements or input keys 15 and a display panel 17 for displaying various functions of the programmable thermostat, as depicted schematically in FIGS. 1 and 2. The design of the thermostat control panel 13 of the present invention may be of various sizes, shapes and configurations. The programmable thermostat 10 may include many different computer architectures, but generally requires a temperature sensor 18, a microprocessor or central processing unit (CPU) 19 having a permanent memory such as a read only memory (ROM) 20 for storing the program instructions for operation and control of the thermostat, a working memory or random access memory (RAM) 21 that retains or receives at least the particular program set for that day, and a clock 23. The program set, whether that be a default program set or a desired program set as is known in the art, includes a plurality of times and a plurality of temperatures over a given day associated with both a heating mode and a cooling mode. The microprocessor keeps track of the current day and the present time of day and determines which program of the various program sets the thermostat should be set in, when in its program mode, and then sets the temperature value and controls heating and/or cooling units 22 (HVAC space conditioning equipment) for the appropriate heating or cooling mode through relays, for example, as is well known in the art.

Programmable thermostats that include the present invention may be pre-programmed to enable the operator or user of the thermostat to create or program the thermostat to provide a default program set in the working memory, in accordance with an instruction manual that the user receives with the thermostat or in accordance with prompts that are displayed on the display panel 17. Alternatively, the default program set may be stored in the permanent memory by the thermostat manufacturer and this default program set may be automatically transferred into the working memory upon initialization of the thermostat.

The control panel 13 includes a plus "+" input key 24, a minus "−" input key 25, a schedule input key 26, a home away input key 27, a save away input key 28, a back input key 29, a next input key 30, a home/done input key 31 and a menu input key 32. The control panel 13 also includes a cool indicator 33, an off indicator 34, a heat indicator 35, an EM heat indicator 36, an auto indicator 37, a refresh indicator 38, and an on indicator 39. The functions of these keys and indicators are conventional and well known in the art.

The display panel 17 of the control panel 13 includes a number of display indicia that appears at different times upon the display, as best illustrated in the drawings and description of the programming method described herein. The display indicia includes a days of the week 41, current temperature 42, current time 43, desired temperature display 44, and an efficiency graphic 45 in the form of a five bar efficiency bar graph. Additional indicia that can be displayed are start times, end times, fan symbols, and other commonly used nomenclature associated with thermostats.

In use, the system is initially set up by entering the "day" (Monday through Sunday) and "time" utilizing the "+" input key 24 or "−" input key 25 until the appropriate day and time appear, the entry of which is indicated by a flashing "UPDATED" indicia after the Home/Done input key 31 is pressed.

The system then prompts the user to enter a desired program set of custom schedule which is associated with a plurality of desired time and temperature programs that include the entry of a desired temperature value and desired time value, indicated by the illumination of the display directly adjacent the "Schedule" input key 26, as shown in FIG. 1. The current period is displayed upon the display panel 17. If the user initially skips the schedule set-up process, then the default program set (pre-programmed) or schedule will go into effect. The default schedule provides for a fairly standard time schedule with temperature settings which provide comfort yet are high enough on the cool setting (cooling mode) and low enough on the heat setting (heating mode) to provide a very efficient mode of operation of the HVAC unit. This very efficient setting also results in the Energy Savings bar graph 45 indicating the maximum efficiency of 5 illuminated bars representing a "best" setting.

If the user wishes to program the thermostat with his or her own schedule (a desired program set) the user presses the Schedule input key 26. The user then selects the days (Monday through Friday) through the use of the "+" and "−" input keys, which turns the indicator arrow on the display on or off accordingly. The Next and Back input keys may be used to move to the next calendar day. The depression of the Home/Done input key takes the user to the period menu in order to select the time periods the user desires to program. Again, the user utilizes the "+" and "−" input keys to select the desired start and end times. The system may include distinct periods of time wherein the user is "AWAY", "ASLEEP", "AT HOME" or "OFF". Again, the depression of the Home/Done input key progresses the program to the temperature selection segment.

Figure 2:
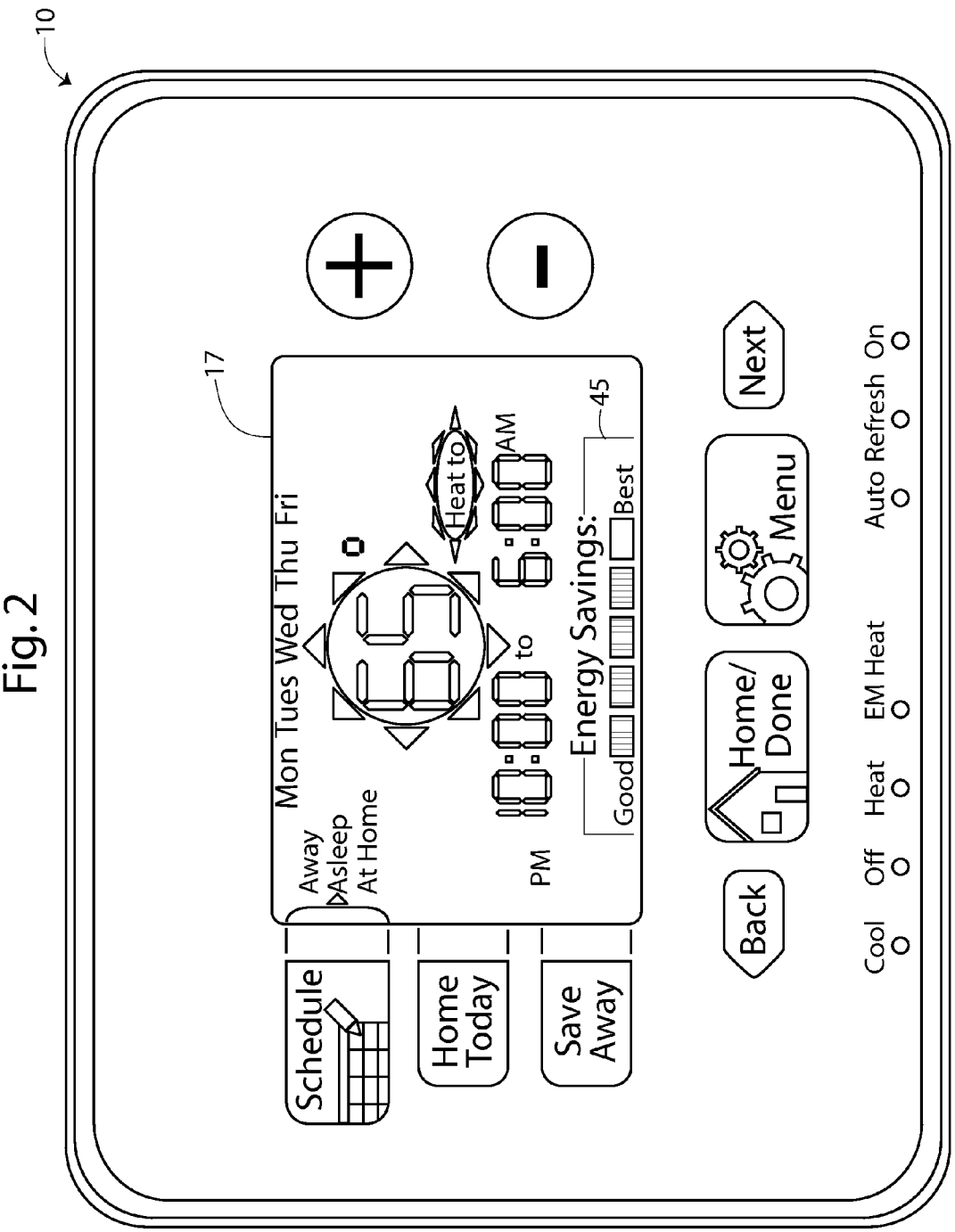
FIG. 2 is a schematic view of the thermostat of FIG. 1.

The user then uses the "+" and "−" input keys to change the desired temperature (one degree movement per depression) from the default temperature. The thermostat's microprocessor 19 compares the desired temperature value to the default temperature value of the cooling or heating mode and according to a preprogrammed algorithm graphically displays the systems efficiency through the use of the bar graph 45. For example, a deviation of 1 degree Fahrenheit from the default temperature will cause the bar graph to change from displaying 5 bars to the displaying of only 4 bars, thereby reducing the displayed efficiency from "BEST" to one bar below "BEST" or one bar closer toward "GOOD" as shown in FIG. 2. Continuing with this example, a 2 degree deviation from the default results in the display of 3 bars, a 3 degree deviation results in the display of 2 bars, and a 4 degree deviation results in the display of one bar (indicating a "GOOD" rating). Here, each one degree change from the default results in the removal of one bar from the bar graph. The algorithm that controls the display of the bars in the bar graph 45 may be based upon temperature variations from the default or a combination of temperature and time length variations from the default. Thus, a user can immediately recognize the change in the efficiency of the HVAC as a result in the change of the desired set temperature from the default set temperature.

A combination of temperature and time length variations may be best illustrated as follows: the thermostat is preprogrammed to include a default program set of a default time and temperature program settings. The first time and temperature program is a first time period or value of "AWAY" occurring between 8:00 am and 6:00 pm with a heating temperature setting or value of 63 degrees and a cooling temperature setting (cooling mode) or value of 82 degrees, a second time period of "ASLEEP" occurring between 10:00 pm and 6:00 am the next day with a heating temperature setting 67 degrees and a cooling temperature setting of 82 degrees, thus leaving a third time period of "AT HOME" occurring between 6:00 am and 8:00 am and between 6:00 pm and 10:00 pm with a heating temperature setting of 71 degrees and a cooling temperature setting of 74 degrees. A 1 degree increase in the set heating temperature, through an input of such in the desired program set, in the "AT HOME" third time period will normally result in the bar graph moving from showing bars to only showing 4 bars, illustrating that the increase in the heating temperature results in a less efficient energy consumption. However, if the user additionally shortens the "AT HOME" third time period by 2 hours (increasing the "AWAY" first time period by 2 hours with a resulting decrease in the heating temperature setting for those 2 hours from 71 degrees to 63 degrees) the overall efficiency is computed to be equivalent to the default setting. Therefore, the system does not reduce the number of bars from 5 bars to 4 bars, but maintains the number at 5 bars. In other words, the increase in the temperature value of 1 degree for the "AT HOME" period is offset by the 2 hour increase in the "AWAY" period of time value at the lower 63 degree heating temperature. Again, a user can immediately recognize the change in the efficiency of the HVAC system efficiency as a result in the change of the desired set temperature from the default set temperature and a change in the time period from the default time period.

Similarly, if a user increases the "AT HOME" third time period without changing any temperature settings, the result may be the removal of a display bar to show the lower overall efficiency of the HVAC system. The reason for this is that the HVAC system is working a longer time at the higher temperature associated with the "AT HOME" time period as compared to the temperature associated with the "AWAY" time period, i.e., two hours have had their associated heating set temperatures changed from 63 degrees to 71 degrees.

It should be understood that even though the preferred embodiment graphically illustrates the efficiency of the set temperature through a bar graph, any type of graphic, symbolic, or dynamic illustration or visual cue such as through actual graphs, symbolic representations or nomenclature, numeric values, flashing lights, the frequency of flashing lights, or the like may be utilized to display such "graphically" on the display panel. It should also be understood that the algorithm utilized to determine the efficiency deduced from the time periods and temperature set points may be different from those used in the examples herein.

It thus is seen that a thermostat is now provided which overcomes problems with those of the prior art. While this invention has been described in detail with particular references to the preferred embodiments thereof, it should be understood that many modifications, additions and deletions, in addition to those expressly recited, may be made thereto without departure from the spirit and scope of the invention as described by the following claims.

The invention claimed is:

1. A programmable thermostat for controlling space conditioning equipment comprising:
    a temperature sensor;
    a display panel including a system efficiency display graphic;
    a clock;
    a processor;
    memory coupled to said processor for receiving a manufacturer preselected default program set for at least one of a heating and cooling mode, said manufacturer preselected default program set defined by a plurality of manufacturer preselected default time and temperature programs, each manufacturer preselected default time and temperature program including a manufacturer preselected default program time value and a corresponding manufacturer preselected default program temperature value, for each of the at least one heating and cooling said memory also receiving a user selected desired program set for at least one of the heating and cooling mode, said user selected desired program set defined by at least one user selected desired time and temperature program which includes a user selected desired program temperature value, and
    a manually selectable input element for initiating a change to the user selected desired program temperature value;
    said processor including comparing means for comparing the user selected desired program temperature value to the manufacturer preselected default program temperature value for a corresponding manufacturer preselected program time value and calculating a resulting efficiency level which is displayed upon said system efficiency display graphic of said display panel.

2. The programmable thermostat of claim 1 wherein said display graphic is a bar graph.

3. The programmable thermostat of claim 1 wherein said at least one user selected desired time and temperature program includes a user selected desired program time value, wherein said manually selectable input element also initiates a change in said user selected desired program time value, and wherein said comparing means also compares said user selected desired program time value to said manufacturer preselected default program time value in calculating a resulting efficiency level which is displayed upon said system efficiency display graphic of said display panel.

4. A programmable thermostat for controlling space conditioning equipment comprising:
  a temperature sensor;
  a display panel;
  a clock;
  a processor including memory for receiving a plurality of manufacturer preselected default programs each having a manufacturer preselected default time period value and a corresponding manufacturer preselected default temperature value, said memory also receiving a plurality of user selected desired time period values and corresponding user selected desired temperature values, and
  a manually selectable input element for initiating a change to the user selected desired program temperature value;
  said processor being capable of comparing the user selected desired program temperature value to a manufacturer preselected default temperature value for a select user selected time period and calculating a resulting efficiency level which is displayed graphically upon said display panel, 5. The programmable thermostat of claim 4 wherein said display panel displays said efficiency level as a bar graph.

6. The programmable thermostat of claim 4 wherein said processor memory also compares said user selected desired time period values to said manufacturer preselected default time period value in calculating the resulting efficiency level which is displayed graphically upon said display panel.

7. A method of displaying the efficiency of a heating and cooling system comprising the steps of:
  (A) providing a programmable thermostat having memory for storing a manufacturer preselected default program set having a plurality of manufacturer preselected default temperature values each associated with a manufacturer preselected default time value and for storing a user selected desired program set having a plurality of user selected desired temperature values each associated with a user selected desired time value;
  (B) selecting and entering a user selected temperature value into the memory associated with the user selected desired temperature value of the user selected desired program set;
  (C) selecting and entering a user selected time value into the memory associated with the user selected desired time value of the user selected desired program set;
  (D) electronically comparing the user selected desired temperature value and user selected desired time value to the manufacturer preselected default temperature value and manufacturer preselected default time value and electronically calculating a resulting efficiency level, and
  (E) displaying the resulting efficiency level graphically upon a thermostat display panel.

8. The method of claim 7 wherein at step (E) the resulting efficiency level is displayed graphically as a bar graph.

* * * * *